(12) United States Patent
Hunter et al.

(10) Patent No.: US 8,905,854 B2
(45) Date of Patent: Dec. 9, 2014

(54) REACTION COMPONENT FOR LINEAR INDUCTION MOTOR

(75) Inventors: Richard D. Hunter, Ottawa (CA); Andreas Tanzer, Gatineau (CA)

(73) Assignee: HM Attractions Inc. (CA)

( * ) Notice: Subject to any disclaimer, the term of this patent is extended or adjusted under 35 U.S.C. 154(b) by 188 days.

(21) Appl. No.: 13/331,355

(22) Filed: Dec. 20, 2011

(65) Prior Publication Data
US 2012/0132101 A1 May 31, 2012

Related U.S. Application Data

(63) Continuation of application No. 11/681,691, filed on Mar. 2, 2007, now Pat. No. 8,162,770.

(60) Provisional application No. 60/778,384, filed on Mar. 3, 2006.

(51) Int. Cl.
| | | |
|---|---|---|
| A63G 21/18 | (2006.01) | |
| A63G 21/00 | (2006.01) | |
| B60L 13/03 | (2006.01) | |
| A63G 7/00 | (2006.01) | |
| H02K 41/025 | (2006.01) | |
| A63G 3/02 | (2006.01) | |
| A63H 23/02 | (2006.01) | |
| A63G 21/16 | (2006.01) | |
| H02K 7/14 | (2006.01) | |
| A63G 21/08 | (2006.01) | |

(52) U.S. Cl.
CPC ............... *A63G 21/00* (2013.01); *A63G 21/16* (2013.01); *H02K 7/14* (2013.01); *B60L 13/03* (2013.01); *A63G 7/00* (2013.01); *H02K 41/025* (2013.01); *A63G 3/02* (2013.01); *A63G 21/08* (2013.01); *A63G 21/18* (2013.01)
USPC .................................. 472/129; 472/13; 104/70

(58) Field of Classification Search
CPC ........... A63G 3/00; A63G 3/02; A63G 21/00; A63G 21/16; A63G 21/18
USPC ........ 472/13, 116, 117, 128–129; 104/53, 59, 104/60, 69, 70–73, 281, 282, 290, 292, 294
See application file for complete search history.

(56) References Cited

U.S. PATENT DOCUMENTS

| | | |
|---|---|---|
| 3,404,635 A | 10/1968 | Bacon et al. |
| 3,577,928 A | 5/1971 | Victorri |
| 3,667,397 A | 6/1972 | Haynes |

(Continued)

FOREIGN PATENT DOCUMENTS

| | | |
|---|---|---|
| CA | 2 473 804 | 8/2003 |
| CN | 2303755 Y | 1/1999 |

(Continued)

OTHER PUBLICATIONS

USPTO Official Action dated Dec. 9, 2010, issued in connection with U.S. Appl. No. 11/681,712, filed Mar. 2, 2007.

(Continued)

*Primary Examiner* — Kien Nguyen
(74) *Attorney, Agent, or Firm* — Barnes & Thornburg LLP

(57) ABSTRACT

A reaction component or plate for a linear induction motor incorporates a flexibility increasing feature and a wear resistant feature.

12 Claims, 6 Drawing Sheets

(56) References Cited

U.S. PATENT DOCUMENTS

| | | | |
|---|---|---|---|
| 3,667,398 A | 6/1972 | English | |
| 3,770,995 A | 11/1973 | Eastham et al. | |
| 3,830,161 A | 8/1974 | Bacon | |
| 3,947,741 A | 3/1976 | Ball et al. | |
| 3,952,666 A | 4/1976 | Gladish | |
| 4,063,517 A | 12/1977 | Nardozzi | |
| 4,233,906 A * | 11/1980 | Seiler | 104/294 |
| 4,299,171 A | 11/1981 | Larson | |
| 4,484,739 A | 11/1984 | Kreinbihl et al. | |
| 4,984,783 A | 1/1991 | Fujimaki | |
| 4,991,514 A | 2/1991 | Powell et al. | |
| 5,277,125 A | 1/1994 | DiFonso et al. | |
| 5,403,238 A | 4/1995 | Baxter et al. | |
| 5,433,671 A | 7/1995 | Davis | |
| 5,540,622 A | 7/1996 | Gold | |
| 5,552,649 A * | 9/1996 | Cowan et al. | 310/12.09 |
| 5,860,364 A | 1/1999 | McKoy | |
| 6,237,499 B1 | 5/2001 | McKoy | |
| 6,354,223 B2 | 3/2002 | McKoy | |
| 6,397,755 B1 | 6/2002 | Kamier | |
| 6,413,165 B1 | 7/2002 | Crandall et al. | |
| 6,485,372 B2 | 11/2002 | Stuart et al. | |
| 6,629,501 B2 | 10/2003 | McKoy | |
| 6,659,237 B1 | 12/2003 | Pribonic | |
| 6,857,964 B2 | 2/2005 | Hunter | |
| 6,860,209 B2 | 3/2005 | McKoy | |
| 6,971,317 B2 | 12/2005 | McKoy | |
| 7,056,220 B2 | 6/2006 | Hunter | |
| D548,810 S | 8/2007 | Hunter | |
| D567,322 S | 4/2008 | Hunter | |
| 7,437,998 B2 | 10/2008 | Burger et al. | |
| 7,713,134 B2 | 5/2010 | Hunter | |
| 7,740,542 B2 | 6/2010 | Henry et al. | |
| 2002/0142851 A1 | 10/2002 | Hunter | |
| 2004/0077426 A1 | 4/2004 | Hunter | |
| 2005/0098057 A1 | 5/2005 | McKoy | |
| 2005/0192108 A1 | 9/2005 | Hunter | |
| 2005/0288112 A1 | 12/2005 | Hunter | |
| 2006/0219124 A1 | 10/2006 | Jordan | |
| 2007/0034106 A1 | 2/2007 | Miller et al. | |
| 2007/0060403 A1 | 3/2007 | Henry et al. | |
| 2007/0207866 A1 | 9/2007 | Hunter | |
| 2007/0207867 A1 | 9/2007 | Hunter | |
| 2007/0207869 A1 | 9/2007 | Hunter | |

FOREIGN PATENT DOCUMENTS

| | | |
|---|---|---|
| DE | 43 44 755 | 6/1995 |
| EP | 0 487 744 | 6/1991 |
| GB | 1 307 833 | 2/1973 |
| JP | 54 035 914 | 3/1979 |
| JP | 3027 703 | 2/1991 |
| WO | 98 31 444 | 7/1998 |
| WO | 2004/085744 | 10/2004 |

OTHER PUBLICATIONS

Chinese Office Action in Chinese Patent Application No. 200780007714.3 (3 pages), with 3 pages of English translation.

Jan. 20, 2010 Office Action in European Patent Application No. 04 250 876.5-2318 (4 pages).

International Search Report for PCT/CA2007/000333, dated Jun. 15, 2007.

International Search Report for PCT/CA2007/000329, dated Jun. 5, 2007.

European Search Report for EP 07250876, dated Jun. 5, 2007.

International Search Report for PCT/CA2007/000334, dated Jun. 14, 2007.

Chinese Office Action 100083 dated Nov. 14, 2011 (4 pages).

English Translation of Chinese Office Action, "Linear Motor Driven Amusement Ride and Method", dated Nov. 14, 2011 (6 pages).

SIPO Machine Translation of CN 2303755Y (pp. 1-3), Jan. 13, 1999.

* cited by examiner

REACTION COMPONENT FOR LINEAR INDUCTION MOTOR

CROSS-REFERENCE TO RELATED APPLICATIONS

This application is a continuation of U.S. patent application Ser. No. 11/681,691, filed Mar. 2, 2007, which claims the benefit of U.S. Provisional Patent Application No. 60/778,384, filed Mar. 3, 2006, both of which are incorporated herein by reference in their entirety.

FIELD OF THE INVENTION

This invention relates generally to linear induction motors (LIMs), and in particular to reaction components for linear induction motors.

BACKGROUND OF THE INVENTION

LIMs have been used in various applications to move objects, for example, in a conveyance system to convey a pallet within a warehouse system. Conceptually, a LIM is a motor which has been opened out flat with the stator units lying in a linear configuration. The rotor can be replaced with a reaction plate. When the design of the LIM is based on a standard rotary squirrel cage motor, the units of the stator, known as linear induction motor units ("LIM units") when laid flat, each consists of a three phase winding around a laminate core. When the LIM units are energised by an alternating current (AC) supply, a travelling magnetic field is produced. When the plate or rotor is in this magnetic field, a secondary magnetic field is induced in the plate. Whereas the units of the stator when energised in a rotary motor would cause a motor to rotate, when laid flat the induced magnetic field impacts a linear force in the reaction plate.

Various types of reaction plates are known. For example, U.S. Pat. No. 3,577,928 to Vicgorri teaches a reaction plate keel suspended below a vehicle to hang between stator units.

Typically, the LIM units in a LIM remain stationary and the reaction plate moves relative to the LIM units. The moving reaction plates may be subject to wear and bending stresses as they move through the conveyance system.

SUMMARY OF THE INVENTION

In a broad aspect, the invention provides a reaction component for a linear induction motor wherein at least part of the reaction component incorporates a flexibility increasing feature.

According to another aspect, the invention provides a reaction component for a linear induction motor wherein at least part of the reaction component incorporates a wear resistant feature.

BRIEF DESCRIPTION OF THE DRAWINGS

Embodiments of the invention will now be described with reference to the attached drawings, in which.

DETAILED DESCRIPTION OF THE DRAWINGS

One conveyance system in which a LIM can be utilised is an amusement park ride. LIM units can be used to convey a vehicle or raft incorporating a rotor or reaction plate through the amusement park ride. For example, the LIM units may be utilised to affect the motion of a raft in a flume ride by accelerating or decelerating the raft either on an incline or along a flat section. In such a system, the LIM units can be positioned in the flume of the flume ride and a reaction plate can be positioned in the raft. Conveyance systems incorporating LIMs are detailed in co-owned applications entitled "Linear Motor Driven Amusement Ride and Method" and "Linear Motor Driven System and Method" filed concurrently with the present application and incorporated herein by reference in their entirety.

In order to minimise the amount of power necessary for the energised LIM units to induce movement of the raft, the reaction plate can be positioned as close as possible to the LIM unit. This leads to the reaction plate being positioned in the bottom of the raft if the LIM units are positioned at the riding surface of the flume.

A reaction plate positioned in the raft is subject to various stresses. For example, the movement of the raft over the LIM unit or riding surface will subject the reaction plate and the bottom of the raft to frictional wear. Further, the movement of the raft from inclines to flat surfaces and vice versa, and the movement of the raft around corners, will subject the raft and, by extension the reaction plate, to bending and twisting stresses.

Figure 1A:
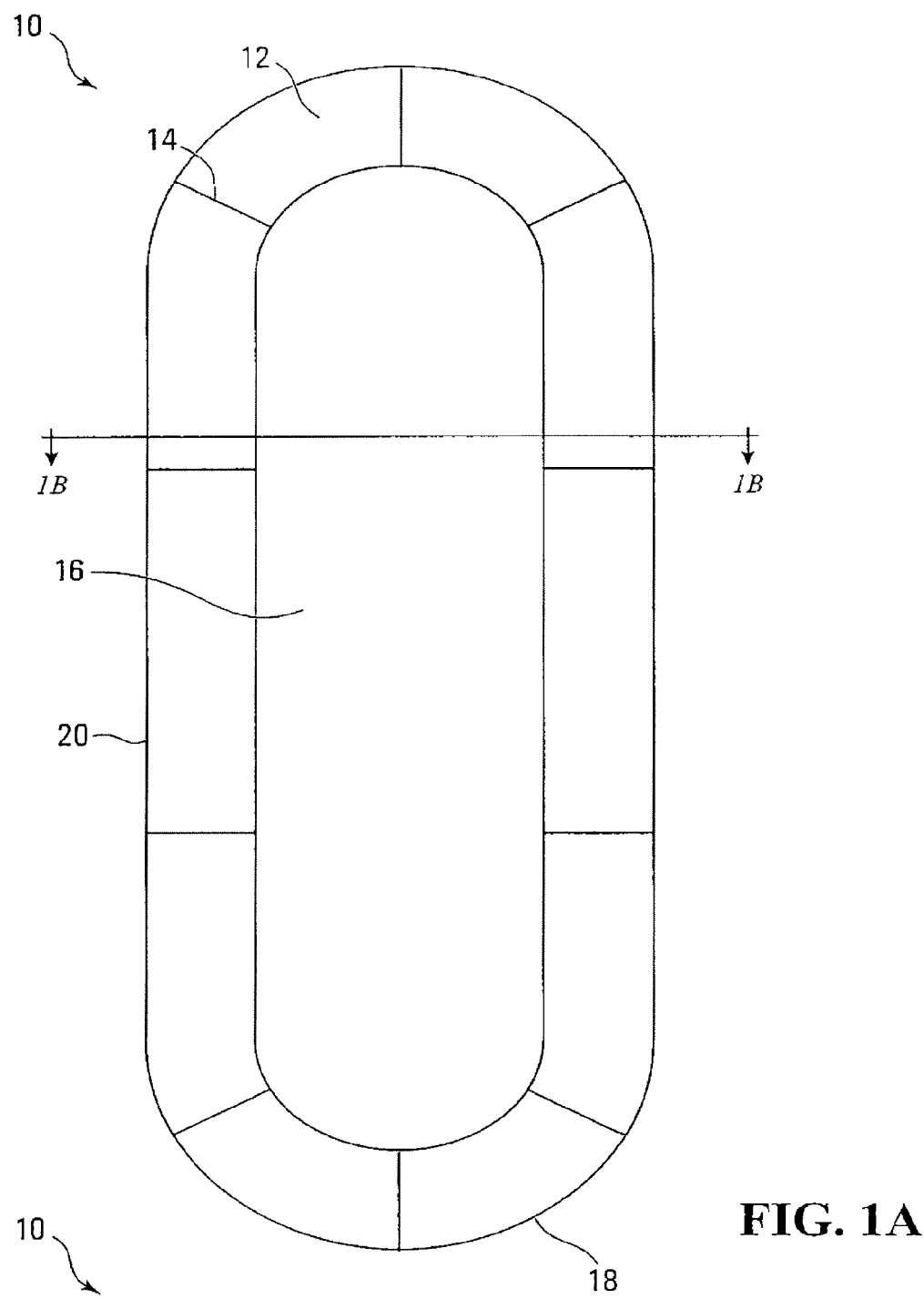
FIG. 1A is a bottom view of a reaction plate according to an embodiment of the invention.
Figure 1B:
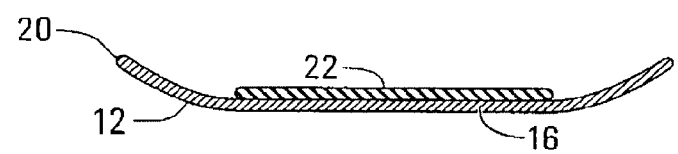
FIG. 1B is a cross-sectional view of the reaction plate of FIG. 1A, taken along line 1B-1B.

FIGS. 1A and 1B depict an example of a reaction plate 10 which may be utilised as part of a LIM for a flume ride. The reaction plate 10 has a generally rectangular shape. The corners 18 of the reaction plate 10 may be rounded. The rounding of the corners 18 helps reduce wear of the reaction plate 10 and of the raft incorporating the reaction plate 10. Other shapes which avoid sharp corners can be used, such as an oval shaped plate or an octagonal shaped plate in which the corners are truncated. The embodiment depicted in FIG. 1A is approximately 72 inches long and 18 inches wide. Other dimensions appropriate to other sized vehicles also fall within the scope of the invention.

The reaction plate 10 includes a centre area 16. The centre area 16 may be flat and approximately 14 inches in width. The centre area 16 is surrounded by a perimeter area 12. The perimeter area 12 is approximately 2 inches in width. Unlike the centre area 16, in this embodiment the perimeter area 12 is not flat. Instead, the perimeter area 12 is curved upwards. The radius of curvature of the perimeter area 12 is approximately 4 inches. The perimeter area 12 extends up from the centre area 16 on a smooth tangent. The contour of the perimeter area 12 also helps to reduce wear on and by the reaction plate 10. The perimeter area 12 is curved in two planes, the upward curve as seen in FIG. 1B and the rounded corners as seen in FIG. 1B. These curvatures, in contrast to sharp corners reduce wear on the bottom of a vehicle incorporating the reaction plate 10. Wear on the surface over which the vehicle travels is also reduced by the absence of sharp corners.

As can be seen from FIG. 1B, in the embodiment of FIGS. 1A and 1B the reaction plate 10 is comprised of a lower plate component 20 and an upper plate component 22. Both the lower plate component 20 and the upper plate component 22 may be of uniform thickness. The curvature of the perimeter area 12 of the reaction plate 10 increases the overall rigidity of the reaction plate 10 relative to an uncurved reaction plate of the same thickness. This could create problems when the reaction plate 10 needs to flex in response to encountering a curvature in its path. As a result, the perimeter area 12 has defined through it a plurality of slots 14 to increase flexibility. The slots 14 cut all the way through the thickness of the reaction plate 10 and extend from the edge of the reaction plate 10 through the entire perimeter area 12. In this embodiment, the slots are 1/32" wide. Other widths are acceptable which allow relative movement of the portions of the plate 10 on either side of the slots 14. The number and spacing of the slots 14 may vary. In one embodiment, slots 14 are positioned in line with the thwarts of a raft incorporating the reaction plate 10. Although the embodiment depicted in FIGS. 1A and 1B utilise slots cut all the way through the reaction plate 10, the slots may not be cut all the way through. The slots 14 may be replaced with thinning of sections of the perimeter 12. Further, the thinning, slots or other flexibility increasing features may extend into the centre area 16 or may not extend all the way through the perimeter area 12.

Other flexibility increasing features may also be used. For example, the perimeter area 12 may be thinned relative to the centre area 16 or tapered towards the edge.

The reaction plate 10 of the embodiment of FIGS. 1A and 1B, as noted above, also includes an upper plate component 22. The upper plate component 22, in this embodiment, is flat, has a pill-shaped outline, and has rounded corners when viewed from the side edges. The upper plate component 22 covers the centre area 16 but does not extend into the perimeter area 12. The relative sizing is not essential and the upper plate component 22 may be larger or smaller than depicted. Stopping the upper plate component 22 at the inner edge of the perimeter area 12 means that the upper plate component 22 does not add to the rigidity of the perimeter area 12.

In this embodiment, the lower plate component 20 is formed of a non-ferromagnetic conductive material such as aluminum or copper. The magnetic field created by the LIM units induces a current in the conductive material which reacts to the magnetic field and creates a thrust which moves the plate. A higher conductivity generally results in an increased current and thereby enhances the response to the magnetic field of the LIM units.

The upper plate component 22 is comprised of a ferromagnetic material such as steel or iron. The ferromagnetic material in this embodiment is non-conductive or has a low conductivity so that little or no current is induced in the upper plate component 22. The presence of the upper plate component 22 enhances the performance of the reaction plate 10 by providing return paths for the LIMs' magnetic flux, but is not essential.

The upper plate component 22 may be eliminated. The lower plate component 20 may also be formed of iron or steel. The upper plate component 22 and the lower plate component 20 may be fixed to each other by a spot adhesive or other means to retain their relative position.

The upper plate component 22, for example, may be comprised of a 3/32" sheet of A36 galvanized steel affixed to a lower plate component 20 which is a 1/8" sheet of 1050, 1100, 1200 or 5005 aluminum. The thickness and composition of the plate will depend on the requirements of the system and can be varied from these ranges.

Figure 1C:
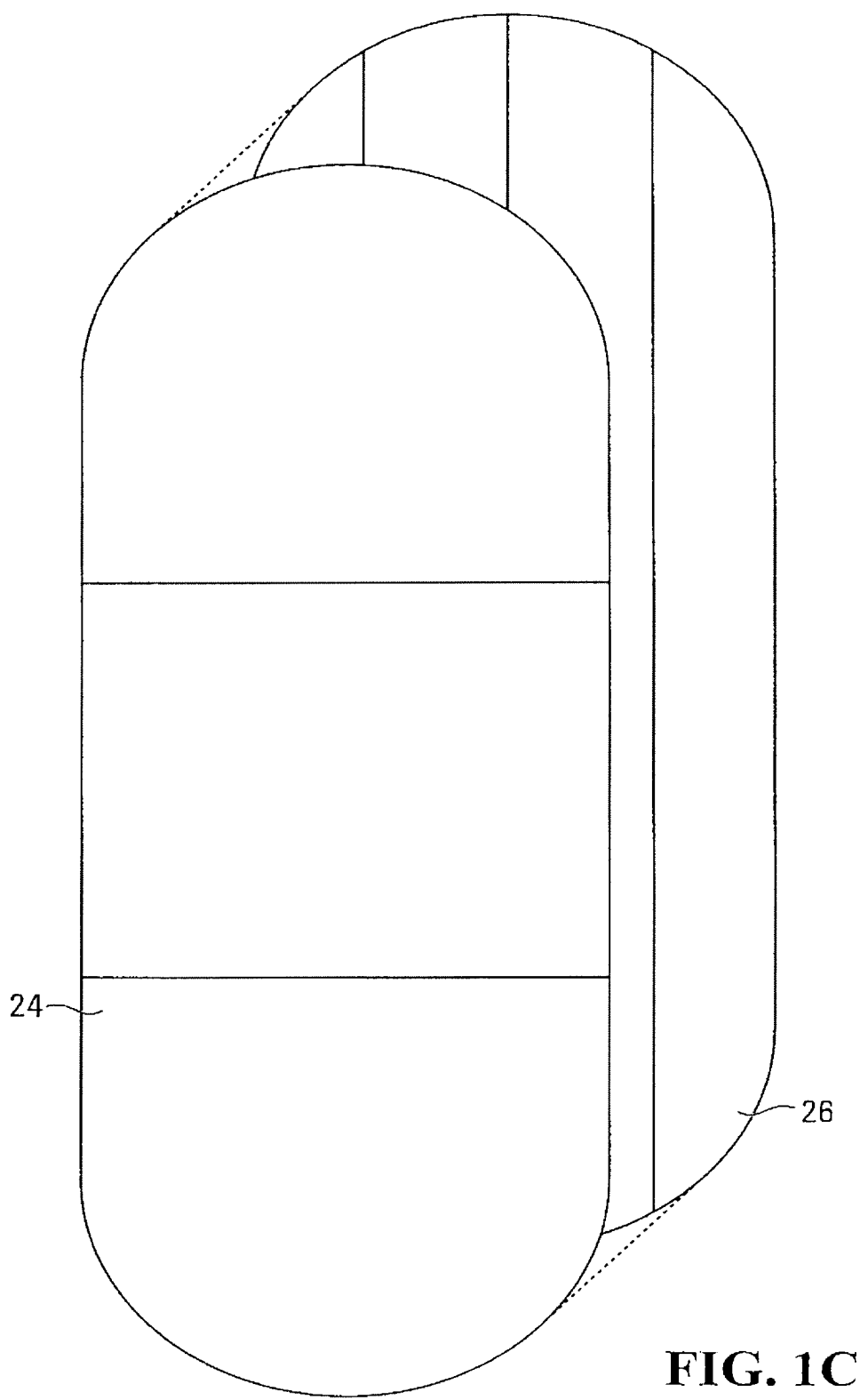
FIG. 1C is an exploded top view of a reaction plate according to another embodiment of the design.

FIG. 1C depicts another means for increasing flexibility of a reaction plate. In this embodiment, neither the upper plate component 24 nor the lower plate component 26 is made of a single plate. Instead, the upper plate component 24 is made of three plate sections butted together. Similarly, the lower plate component 26 is made of four plate sections butted together. The sections of the upper plate component 24 and the lower plate component 26 are then connected by an adhesive such as a cyanoacrylate adhesive from ITW Plexus. This maintains the relative position of the plate sections. The butted joints of the plate sections allow increased flexibility of this construction relative to the use of single plates. The two layers are split in opposite directions to allow for movement in the two directions.

The butted plate sections depicted in FIG. 1C may be replaced with a thinning of the plates. Also, conductive cable or mesh ply may be used to connect the plate sections. However, such sectioned plates, thinning and other changes from uniform thickness solid plates would affect the electrical performance of the LIM reaction plates.

The reaction plate 10 depicted in FIGS. 1A and 1B is shown as having a flat central area 16 and an upwardly curving perimeter area 12. It will be understood that the reaction plate 10 may be entirely convex or concave to match the shape of the surface over which it travels. Matching the shape of the plate and the riding surface minimises the gap between the reaction plate and the LIM units which increases the efficiency of the LIM.

Figure 2:
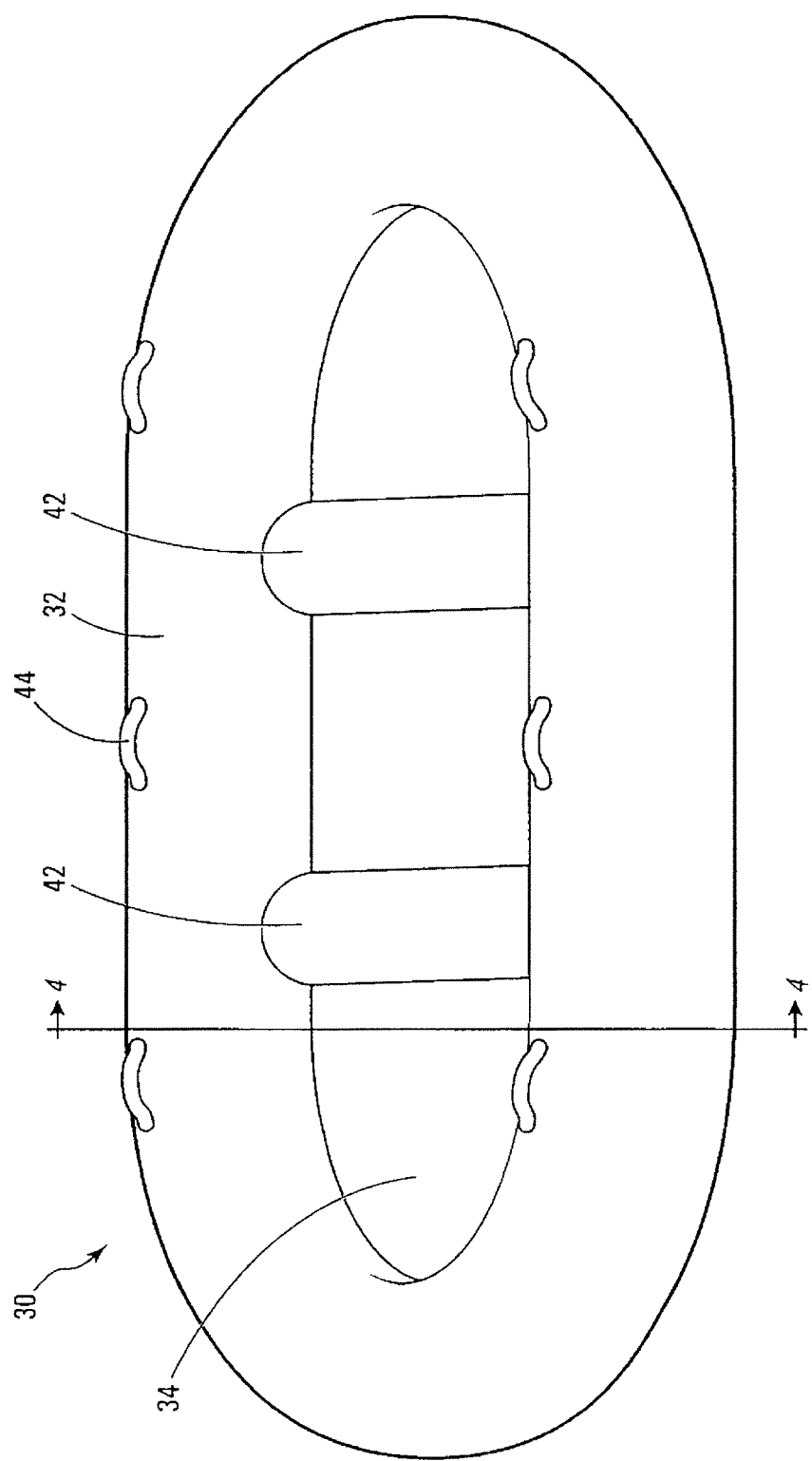
FIG. 2 is a perspective view of a raft incorporating a reaction plate according to the embodiment of FIG. 1A.

FIG. 2 depicts a raft 30 incorporating the reaction plate 10. The raft 30 is comprised generally of sides 32 which are inflated rubber tubes. Handles 44 are spaced along the sides 32 to be gripped by the riders of the raft. Spaced along the raft are thwarts 42 which extend between the sides 32. The thwarts are inflated in a similar manner to the sides 32. The floor of the raft 30 has a top layer 34. Side slots of the slots 14 of the reaction plate 10 in one embodiment, are positioned under the thwarts 42 which are spaced at 28" on centre and end slots are on the centreline and 6" off the centreline on both ends of the raft.

Figure 3:
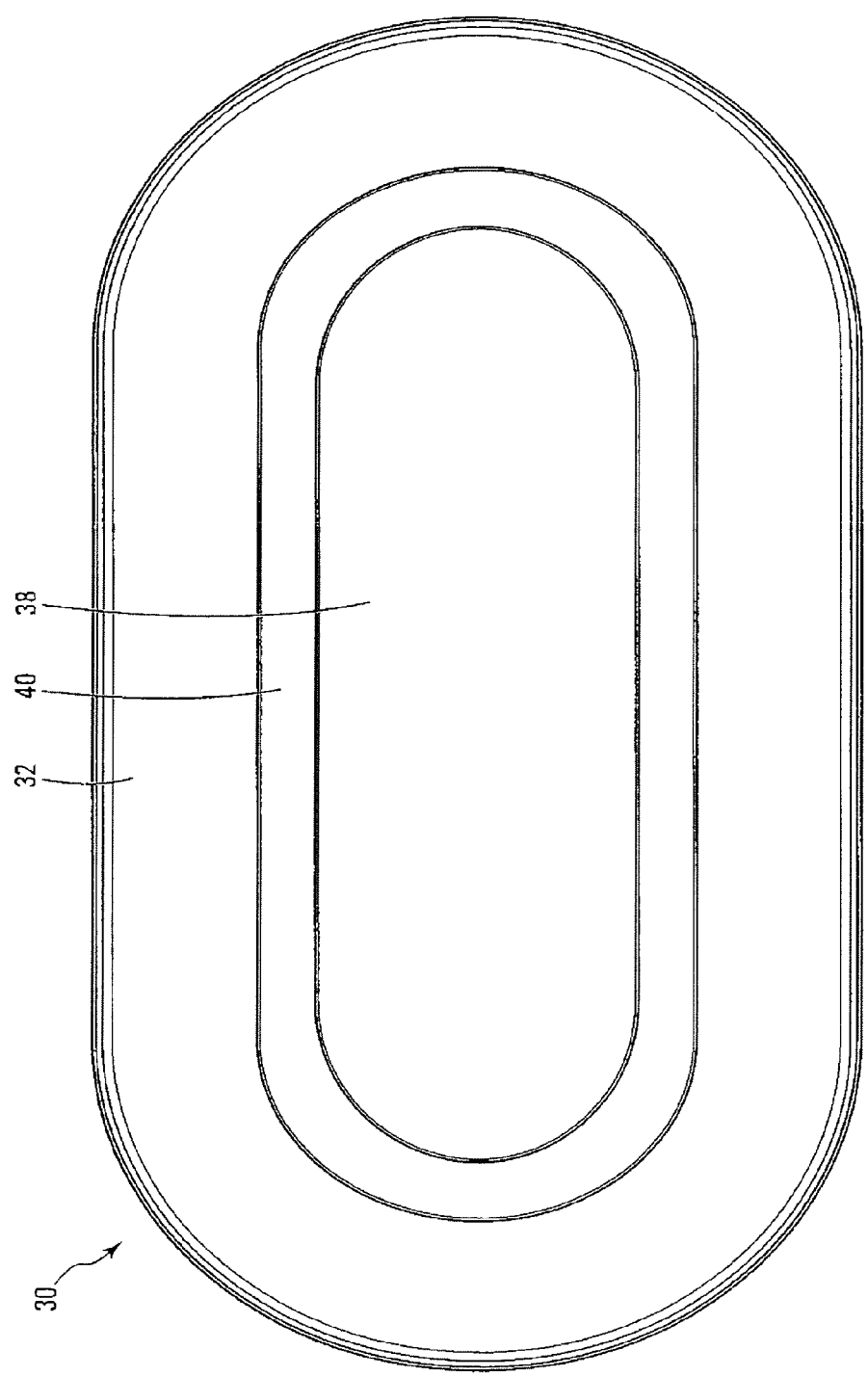
FIG. 3 is a bottom view of the raft of FIG. 2.

FIG. 3 depicts a bottom view of the raft 30. The floor of the raft has a bottom layer 38. The sides 32 are also visible on this view. A wear resistant layer 40 extends around the periphery of the bottom layer 38. The wear resistant layer 40 is depicted as extending all the way around the perimeter of the bottom layer 38. However, the wear resistant layer may be limited to any portion of the bottom layer 38, for example, it may be limited to the end portions or simply the front end portion depending on the wear to which the floor of the raft is subjected.

Figure 4:
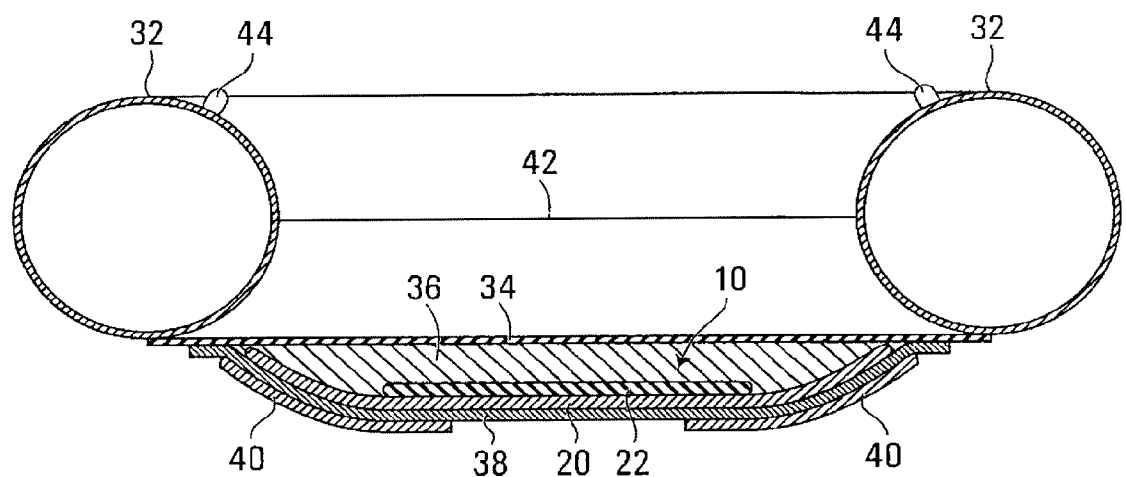
FIG. 4 is a cross-sectional view of the raft of FIG. 2 taken along line 4-4.

FIG. 4 depicts a cross-sectional view of the raft 30 taken along line 4-4 of FIG. 2. The reaction plate 10, comprised of the upper plate component 22 and the lower plate component 20, is positioned within a pocket formed by the top layer 34 of the raft floor and the bottom layer 38 of the raft floor. A volume formed by the curvature of the perimeter area 12 of the reaction plate 10 is filled with a filler 36. The filler 36 may be foam or other filler material. In one embodiment, the filler material is a polyurethane closed cell foam layered with different densities. The filler material 36 helps prevent the upper edges of the lower plate component 20 from wearing through the top layer 34 of the raft floor, maintains the reaction plate 10 at the bottom of the volume forward by the curvature of the perimeter area 12, and enhances comfort for the rider. The top layer 34 of the raft floor is affixed to the sides 32 of the raft and the bottom layer 38 of the raft floor is affixed to the top layer 34 of the raft floor creating water tight seals. The wear resistant layer 40 extends around the perimeter of the bottom layer 38 and overlies the perimeter area 12 of the reaction plate 10. The wear resistant layer of the present embodiment is 4" wide and is formed of ultra-high molecular weight (UHMW) plastic fixed to the bottom layer 38 by an adhesive. Other wear resistant materials may be used.

The sides 32, the top layer 34 and the bottom layer 38 of the raft are typically made of heavy-duty re-enforced vinyl.

Figure 5:
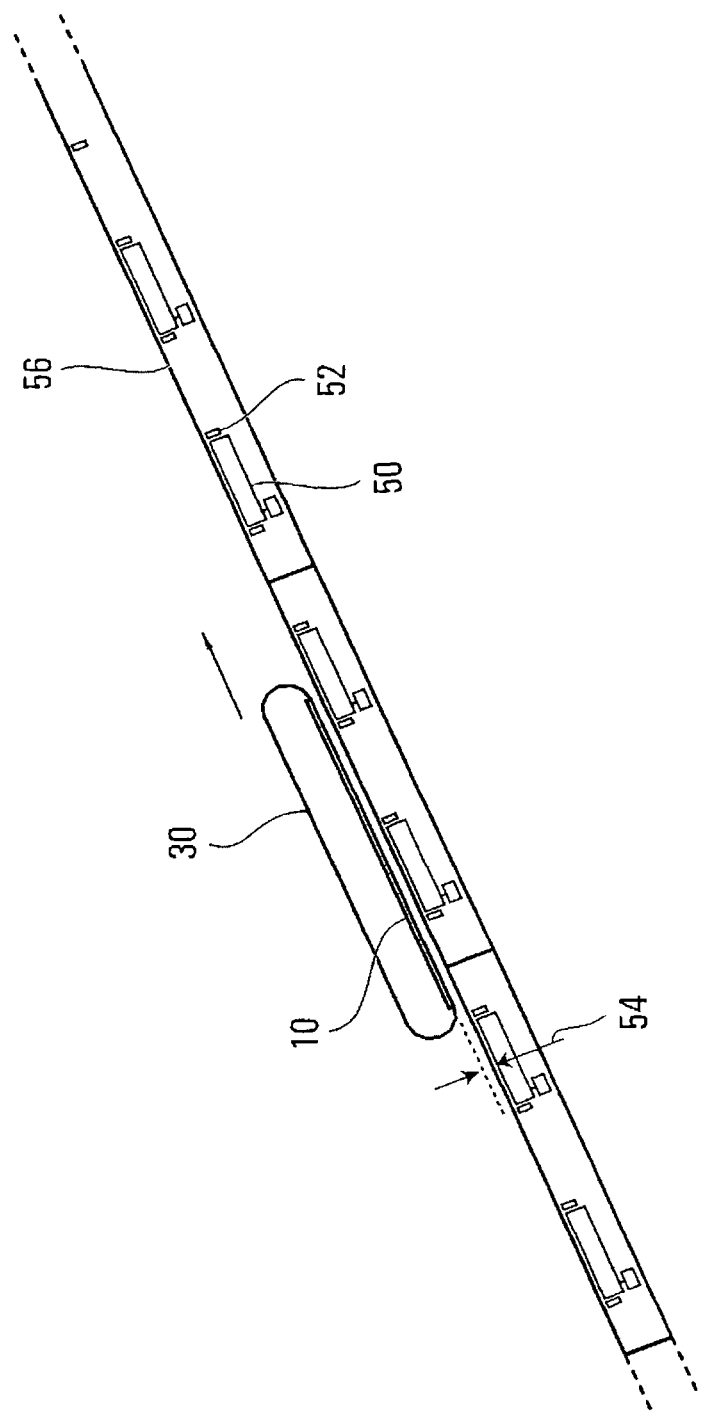
FIG. 5 is a schematic representation of a conveyance system incorporating the reaction plate according to the embodiment of FIG. 1.

FIG. 5 depicts a schematic view of the raft 30 in use. A sliding surface 56 is provided with LIM units 50 positioned under the sliding surface 56. Adjacent the LIM units 50 are sensors 52. The raft 30 incorporates the reaction plate 10. In this embodiment, the raft slides on a microlayer 54 of water which functions as a lubricant. For other embodiments, other lubricants can be used, such as oil. Alternatively, if the bottom surface of the vehicle and the surface over which it travels are low friction, the lubricant may be entirely eliminated.

In FIG. 5, the sensors 52 detect both the presence of the reaction plate and the calculate the speed of the raft. This information is used to indicate when and how much to power the LIM unit associated with the sensor. For example, the LIM units may be powered individually or in pairs, or three at a time with variable power levels. As the raft 30 travels over each successive LIM unit 50, the LIM unit 50 is energised creating a ferromagnetic field which induces a magnetic field in the reaction plate 10 and propels the raft 30 past the LIM unit. The raft 30 is then propelled over a subsequent LIM unit with sensors which detect the reaction plate 10 and energise to further propel the raft 30.

Although FIG. 5 shows the raft 30 being propelled up a slope, it will be understood that the LIM may be used for other motions, for example, to move the raft across a flat section, down an incline or around a corner. The reaction plate 10 may also be used in vehicles which accelerate or decelerate in response to input from LIM units.

The application has been described with the reaction plate travelling and the LIM units stationary. Alternatively, the LIM units may travel and the reaction plates may be stationary.

Further, although the embodiment depicted shows that the reaction plate 10 is held within a pocket defined by the floor of the vehicle, it will be appreciated that the reaction plate itself may form the floor of the vehicle without additional protective layers.

Numerous modifications and variations of the present invention are possible in light of the above teachings. It is therefore to be understood that within the scope of the amended claims the invention may be practised otherwise than as specifically described herein.

The invention claimed is:

1. A water amusement ride vehicle including a reaction component for a linear induction motor wherein at least part of the reaction component incorporates a flexibility increasing feature and wherein the reaction component is contoured to a shape of a riding surface of the vehicle.

2. The water amusement ride vehicle according to claim 1 wherein the reaction component comprises two areas, one of the areas incorporating the flexibility increasing feature.

3. The water amusement ride vehicle according to claim 1 wherein the reaction component comprises a plate and at least a portion of the perimeter of the plate incorporates the flexibility increasing feature.

4. The water amusement ride vehicle according to claim 3 wherein the flexibility increasing feature is incorporated around the entire perimeter of the plate.

5. The water amusement ride vehicle according to claim 1 further comprising a wear resistant feature.

6. A water amusement ride vehicle according to claim 1 wherein the reaction component is at the bottom of the vehicle.

7. The vehicle according to claim 6 wherein the bottom further comprises a wear resistant material layer.

8. The water amusement ride vehicle according to claim 1 and wherein the reaction component comprises a plate and the flexibility increasing feature comprises selectively thinned plate areas.

9. The water amusement ride vehicle according to claim 1 wherein the reaction component comprises a plate and the flexibility increasing feature comprises the plate being formed of at least two abutting plate sections.

10. A vehicle including a reaction component for a linear induction motor wherein at least part of the reaction component incorporates a wear resistant feature at the bottom, wherein the bottom further comprises a wear resistant material layer and wherein the wear resistant material layer covers outer edges of the wear resistant feature.

11. A water amusement ride vehicle including a reaction component for a linear induction motor wherein at least part of the reaction component comprises a plate and at least a portion of the perimeter of the plate incorporates a flexibility increasing feature comprising slots cut through the plate and extending inward a distance from a perimeter edge.

12. A reaction component for a linear induction motor wherein at least part of the reaction component comprises a plate and at least a portion of the perimeter of the plate comprises means for increasing flexibility of at least a portion of the perimeter of the plate; and wherein a surface of the plate is contoured to a shape of a riding surface for a vehicle incorporating the plate.

* * * * *